United States Patent [19]

Geck et al.

[11] Patent Number: 5,401,821

[45] Date of Patent: Mar. 28, 1995

[54] PROCESS FOR THE PREPARATION OF AN ORGANOPOLYSILOXANE RESIN

[75] Inventors: Michael Geck, Burghausen; Christian Herzig, Taching; Bernward Deubzer, Burghausen; Helmut Oswaldbauer, Stubenberg/Fürstberg, all of Germany

[73] Assignee: Wacker-Chemie GmbH, Munich, Germany

[21] Appl. No.: 165,788

[22] Filed: Dec. 13, 1993

[30] Foreign Application Priority Data

Dec. 23, 1992 [DE] Germany .......... 42 43 895.0

[51] Int. Cl.⁶ ............................. C08G 77/08
[52] U.S. Cl. ........................ 528/12; 528/23
[58] Field of Search .................... 528/12, 23

[56] References Cited

U.S. PATENT DOCUMENTS

| | | | |
|---|---|---|---|
| 3,395,117 | 7/1968 | Burzynski et al. ............ | 528/12 |
| 4,218,354 | 8/1980 | Hayati et al. | |
| 4,605,446 | 8/1986 | Isozaki . | |
| 4,707,531 | 11/1987 | Shirahata . | |
| 5,070,175 | 12/1991 | Tsumura . | |
| 5,210,168 | 5/1993 | Bergstrom et al. ............ | 528/23 |

FOREIGN PATENT DOCUMENTS

| | | |
|---|---|---|
| 2078918 | 4/1993 | Canada . |
| 0294277 | 12/1988 | European Pat. Off. . |
| 0535687 | 4/1993 | European Pat. Off. . |
| 4216139 | 11/1993 | Germany . |
| WO93/23455 | 11/1993 | WIPO . |

*Primary Examiner*—Melvyn I. Marquis
*Attorney, Agent, or Firm*—Martin Connaughton

[57] ABSTRACT

Process for the preparation of an organopolysiloxane resin, which comprises
in a first stage reacting at least one silane of the formula $$R_a Si(OR^1)_{4-a} \quad (I)$$

in which a has a value of 0, 1, 2 or 3, R and $R^1$ are monovalent organic radicals which may be the same or different and/or a partial hydrolyzate thereof, with the proviso that at least one silane of formula (I), where a is 0 or 1 and/or a partial hydrolyzate thereof is employed, and optionally an organo(poly)siloxane with water in the presence of a poly-protic acid and optionally other substances, subsequently partly neutralizing the acid by addition of a base and then distilling off at least some of the compound $R^1OH$ formed, in a second stage reacting the homogeneous reaction mass resulting from the first stage in the presence of a base and a water-insoluble organic solvent and distilling off the water and the compound $R^1OH$, in a third stage, bringing the homogeneous reaction mass resulting from the second stage to a pH of between 6 and 8 by buffering with a poly-protic acid and/or salts thereof, distilling off the water and any compound $R^1OH$ still present and filtering off the salt which has precipitated, and optionally, in a fourth stage separating the homogeneous reaction mass resulting from the third stage from the water-insoluble organic solvent.

10 Claims, No Drawings

PROCESS FOR THE PREPARATION OF AN ORGANOPOLYSILOXANE RESIN

FIELD OF INVENTION

The invention relates to a process for the preparation of an organopolysiloxane resin by hydrolysis and condensation of silanes and/or partial hydrolyzates thereof and to their use.

BACKGROUND OF THE INVENTION

Processes for the preparation of organopolysiloxane resins are already known. For example, U.S. Pat. No. 4,707,531 (Toray Silicone Co., Ltd.; issued on Nov. 17, 1987) describes a process for the preparation of organopolysiloxane resins in which alkoxysilane is metered into a mixture of disiloxane and/or trialkylsilane and aqueous hydrochloric acid containing at least 5% by weight of hydrogen chloride. The use of large amounts of hydrogen chloride allows the molecular weight of the resin to be controlled here by choosing the ratio of the molar contents of monofunctional units to tetrafunctional units. U.S. Pat. No. 5,070,175 (Shin-Etsu Chemical Co., Ltd.; issued on Dec. 3, 1991) describes a process for the preparation of an organopolysiloxane having tetrafunctional siloxane units by heating a mixture of alkyl silicate and organosilane or oligomeric organosiloxane compound at a temperature which is at least 10° C. above the boiling point of the mixture under normal pressure in the presence of water and a catalyst containing sulfonic acid groups in a closed reaction vessel. The German patent application, file number P 42 16 139.8 (Wacker-Chemie GmbH; applied for on May 15, 1992) describes a process for the preparation of an organopolysiloxane resin by acid hydrolysis of silanes or partial hydrolyzates thereof and after-treatment with a base in the presence of an organic solvent which is insoluble in water.

SUMMARY OF THE INVENTION

The object of the present invention is to provide a process with which organopolysiloxane resins can be prepared in a simple manner, readily reproducibly and with high space/time yields.

The invention relates to a process for the preparation of an organopolysiloxane resin which comprises in a first stage reacting at least one silane of the formula $$R_a Si(OR^1)_{4-a} \qquad (I)$$

in which
- a is 0, 1, 2 or 3,
- R can be identical or different and represents a monovalent organic radical,
- $R^1$ can be identical or different and represents a monovalent organic radical, and/or a partial hydrolyzate thereof, with the proviso that at least one silane of formula (I) where (a) is 0 or 1 and/or a partial hydrolyzate thereof is present, and, optionally, an organo(poly)siloxane chosen from the group comprising $$R^2{}_3 Si\text{-}O\text{-}SiR^2{}_3 \qquad (II)$$

in which
- $R^2$ can be identical or different and has one of the meanings given for R, and $$(R^3{}_2 SiO)_b \qquad (III)$$

in which
- $R^3$ can be identical or different and has one of the meanings given for R, and
- b is an integer having a value from 3 to 8, preferably 4 or 5, or mixtures thereof, with water in the presence of a poly-protic acid, and optionally further substances, subsequently partly neutralizing the acid by addition of a base and then distilling off at least some of the resulting compound $R^1OH$, optionally, in a second stage, reacting the homogeneous reaction mass resulting from the first stage in the presence of a base and a water-insoluble organic solvent and distilling off the water and the compound $R^1OH$, optionally, in a third stage, bringing the homogeneous reaction mass resulting from the second stage to a pH of between 6 and 8 by buffering with a poly-protic acid and/or salts thereof, distilling off the water and any compound $R^1OH$ still present and filtering off the salt which has precipitated, and optionally, in a fourth stage separating the homogeneous reaction mass resulting, from the third stage, from the water-insoluble organic solvent.

In the context of the present invention, the term "homogeneous reaction mass" is intended to relate to the liquid phase and to ignore the salt formed during the neutralization.

The radical R is preferably a monovalent hydrocarbon radical having from 1 to 18 carbon atom(s), which can contain substituents which are inert towards water.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such a the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as vinyl, allyl, n-5-hexenyl, 4-vinylcyclohexyl and the 3-norbornenyl radical; cycloalkyl radicals, such as cyclopentyl, cyclohexyl, 4-ethylcyclohexyl and cycloheptyl radicals, norbornyl radicals and methylcyclohexyl radicals; aryl radicals, such as the phenyl, biphenylyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and β-phenylethyl radical.

Examples of substituted hydrocarbon radicals as the radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and the chlorophenyl, dichlorophenyl and trifluorotolyl radical; mercaptoalkyl radicals, such as the 2-mercaptoethyl and 3-mercaptopropyl radical; cyanoalkyl radicals, such as the 2-cyanoethyl and 3-cyanopropyl radical; aminoalkyl radicals, such as the 3-aminopropyl, N-(2-aminoethyl)-3-aminopropyl and N-(2-aminoethyl)-3-amino(2-methyl)propyl radical; aminoaryl radicals, such as the aminophenyl radical; acyloxyalkyl radicals, such as the 3-acryloxypropyl and 3-methacryloxypropyl radical; hydroxyalkyl radicals, such as the hydroxypropyl radical, and radicals of the formula

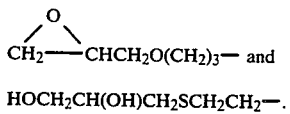 and

HOCH$_2$CH(OH)CH$_2$SCH$_2$CH$_2$—.

The radical R is preferably methyl, n-propyl, vinyl, n-5-hexenyl, 3-norbornenyl, phenyl and tolyl radical, in particular the methyl and vinyl radical.

Examples of the radical R$^1$ are the examples given for R.

The radical R$^1$ is preferably an alkyl group having from 1 to 6 carbon atom(s), which can be substituted by alkoxy groups or hydroxyl groups.

The radical R$^1$ is preferably the methyl, ethyl, n-propyl, iso-propyl and hexyl radical, in particular the methyl and ethyl radical.

Examples of the radical R$^2$ are the examples given for R.

The radical R$^2$ is preferably the methyl, ethyl, vinyl, n-5-hexenyl, 3-norbornenyl and phenyl radical. The methyl and vinyl radicals being particularly preferred.

Examples of the radical R$^3$ are the examples given for R.

The radical R$^3$ is preferably the methyl, vinyl and phenyl radical, the methyl radical being particularly preferred.

If partial hydrolyzates of silanes of general formula (I) are employed in the process according to the invention, those having an average of up to 15 silicon atoms per molecule are preferred.

Examples of the silanes of formula (I) employed in the process according to the invention are tetramethoxysilane, tetraethoxysilane, tetra-n-propoxysilane, methyltrimethoxysilane, vinyltrimethoxysilane, 3-mercaptopropyltrimethoxysilane, 3-chloropropyltrimethoxysilane, phenyltrimethoxysilane, o-, m- and p-tolyltrimethoxysilane, propyltrimethoxysilane, methyltriethoxysilane, vinyltriethoxysilane, 3-mercaptopropyltriethoxysilane, 3-chloropropyltriethoxysilane, phenyltriethoxysilane, o-, m- and p-tolyltriethoxysilane, propyltrimethoxysilane, dimethyldiethoxysilane, dimethyldimethoxysilane and trimethylethoxysilane, tetraethoxysilane, methyltrimethoxysilane, methyltriethoxysilane, phenyltriethoxysilane, o-, m- and p-tolyltriethoxysilane and propyltriethoxysilane and/or partial hydrolyzates thereof preferably being employed and tetraethoxysilane and/or the partial hydrolyzate thereof being particularly preferably employed.

Examples of the organo(poly)siloxanes of formula (II) optionally employed in the process according to the invention are hexamethyldisiloxane, 1,3-diphenyltetramethyldisiloxane, 1,3-bis(n-5-hexenyl)tetramethyldisiloxane and 1,3-divinyltetramethyldisiloxane, hexamethyldisiloxane and 1,3-divinyltetramethyl-disiloxane being preferred and hexamethyldisiloxane being particularly preferred.

Examples of the organo(poly) siloxanes of formula (III) optionally employed in the process according to the invention are hexamethylcyclotrisiloxane, octamethylcyclotetrasiloxane and decamethylcyclopentasiloxane.

A mixture of organo(poly)siloxane of formula (II), is particular one where R$^2$ is the methyl or vinyl radical, and silane of formula (I) where a is 0 and/or partial hydrolyzate thereof in a molar ratio of monofunctional to tetrafunctional units of preferably 0.5:1 to 1.0:1.0, particularly preferably 0.6:1 to 0.9:1, is advantageously employed in the first stage of the process according to the invention.

In the process according to the invention, the silane of formula (I) and/or partial hydrolyzate thereof, is mixed with an optionally present organo(poly)siloxane of formula (II) and/or (III), is reacted with water and a poly-protic acid and optionally other substances in the first stage. A base is then added to the homogeneous reaction mass, preferably in an amount such that in the case of a di-protic acid, more than 50% by weight but less than 100% by weight of the acid employed is neutralized, and in the case of a tri-protic acid at least 34% by weight but less than 66% by weight of the acid employed is neutralized. All or some of the compound R$^1$OH where R$^1$ has the above mentioned meaning formed during the hydrolysis is then removed by distillation.

Water is employed in the first stage of the process according to the invention in amounts of preferably 10 to 30% by weight, particularly preferably 10 to 20% by weight, in each case based on the total weight of the reaction mass of the first stage before the distillation.

Examples of the poly-protic acids employed in the first stage of the process according to the invention are inorganic acids, such as H$_2$SO$_4$, H$_2$SeO$_4$, H$_3$PO$_4$ and H$_3$PO$_3$, and organic acids, such as oxalic acid, maleic acid and malonic acid, H$_2$SO$_4$ and H$_3$PO$_4$ preferably being employed and H$_2$SO$_4$ particularly preferably being employed.

The poly-protic acid is employed in the first stage of the process according to the invention in amounts of preferably 10 ppm (parts per million) to 10,000 ppm, particularly preferably 100 ppm to 5000 ppm, in each case based on the total weight of the reaction mass of the first stage before the distillation.

The pH of the reaction mass in the first stage of the process according to the invention before addition of the base is preferably in the range of from 0 to 3, particularly preferably in the range of from 1 to 2.

Up to preferably 0.01% by weight, based on the total weight of the reaction mass of the first stage before the distillation, of other substances, such as, for example, polymerization inhibitors, which are intended to prevent homopolymerization of olefinic starting substances, such as, for example 1,3-bis-(n-5-hexenyl)-tetramethyldisiloxane, can additionally be employed in the first stage of the process according to the invention.

Examples of polymerization inhibitors which are employed if appropriate are hydroquinone, 4-methoxyphenol, pyrocatechol and BHT (2,6-di-t-butyl-4-methylphenol).

The base is preferably added in the first stage of the process according to the invention, before removal by distillation of the compound R$^1$OH formed, where R$^1$ has the above mentioned meaning, in an amount such that the pH is in the range from 3.0 to 6.5, particularly preferably in the range from 4.0 to 6.0.

Examples of bases are alkali metal hydroxides, such as sodium hydroxide and potassium hydroxide, alkali metal siliconates, such as sodium siliconate and potassium siliconate, amines, such as, for example, methylamine, dimethylamine, ethylamine, diethylamine, triethylamine and n-butylamine, and ammonium compounds, such as, for example, tetramethylammonium hydroxide, tetra-n-butylammonium hydroxide and benzyltrimethylammonium hydroxide, sodium hydroxide, potassium hydroxide, methylamine, ethylamine, diethylamine and benzyltrimethylammonium hydroxide being preferred and sodium hydroxide, potassium hydroxide and methylamine being particularly preferred.

If desired, the base can be added as a mixture with water and/or a polar, water-soluble organic solvent. However, the dilution of the base should not be so high that the addition of base leads to precipitation of the organopolysiloxane resin formed.

In the first stage of the process according to the invention, the compound $R^1OH$, where $R^1$ has the above mentioned meaning, is preferably distilled off to the extent that the reaction mass remains homogeneous. Up to 90% by weight of the compound $R^1OH$, based on the total weight of compound $R^1OH$ formed, where $R^1$ has the above mentioned meaning, is preferably removed by distillation.

The reaction in the first stage of the process according to the invention is preferably carried out at a temperature of 20° C. up to the boiling point of the reaction mass, particularly preferably at 60° C. up to the boiling point of the reaction mass, under the pressure of the surrounding atmosphere, under a pressure of between 900 and 1100 hPa. The compound $R^1OH$, where $R^1$ has the above mentioned meaning, is preferably distilled at the boiling point of the reaction mass under the pressure of the surrounding atmosphere.

When the first stage of the process according to the invention has ended, a water-insoluble organic solvent, at least an amount of base necessary to achieve a basic reaction mass and, optionally, other substances are added to the homogeneous reaction mass and the mixture is allowed to react.

The base is preferably added in the second stage of the process according to the invention in an amount such that the pH is in the range of from 8.0 to 14.0, preferably 9.0 to 13.0. The amounts of base are in general in the range of from 0.05 to 1.0% by weight, based on the total weight of the reaction mass of the second stage before the distillation, depending on the base employed.

All the bases which can also be employed in the first stage can be employed as bases in the second stage of the process according to the invention, the same base as in the first stage preferably being employed.

If desired, the base can be added as a mixture with water and/or a polar, water-soluble organic solvent. However, the dilution of the base should not be so high that addition of the base leads to precipitation of the organopolysiloxane resin formed.

The term water-insoluble organic solvent is intended to be understood below as meaning organic solvents which have a solubility at room temperature under the pressure of the surrounding atmosphere of not more than 1 g of solvent per liter of water.

Examples of water-insoluble organic solvents are hydrocarbons which form a low-boiling azeotrope with water, such as cycolohexane, methylcyclohexane, benzene, toluene, o-, m- and p-xylene and mesitylene, cyclohexane and methylcyclohexane being preferred and cyclohexane being particularly preferred.

The water-insoluble organic solvent employed in the second stage of the process according to the invention is used at least in an amount sufficient to maintain a homogeneous reaction mass. The water-insoluble organic solvent is particularly preferably added in the same number of parts by volume as alcohol and if appropriate water distilled off in the first stage.

Examples of the other substances employed if appropriate in the second stage are silanes of formula (I) in which all or some of the radicals R represent acid-sensitive organic radicals, such as, for example, 3-aminopropyl, N-(2-aminoethyl)-3-aminopropyl and aminophenyl radicals.

The second stage of the process according to the invention is preferably carried out at a temperature between 50° C. and the boiling point of the reaction mass, particularly preferably between 60° C. and the boiling point of the reaction mass, under a pressure of the surrounding atmosphere.

The water contained in the reaction mixture and the remainder of the compound $R^1OH$, where $R^1$ has the above mentioned meaning, are removed completely or virtually completely during the azeotropic distillation carried out in the second stage of the process according to the invention.

The distillation carried out in the second stage of the process according to the invention is advantageously started immediately after addition of the base. Distillation is necessary to achieve an organopolysiloxane resin of high average molecular weight which contains hydroxyl and $R^1O$ groups to only a small extent.

When the second stage of the process according to the invention has ended, the homogeneous reaction mass is preferably brought to a pH of between 6 and 8, preferably 7, by buffering by addition of a poly-protic acid and/or salts thereof, water and any compound $R^1OH$ still present, where $R^1$ has the above mentioned meaning, are distilled off and the salt which has precipitated is filtered off, it being possible, if desired, for some of the water-insoluble organic solvent already to be distilled off before the filtration. The water-insoluble organic solvent is preferably distilled off before the filtration in an amount such that an organopolysiloxane resin concentrate having a content of organopolysiloxane resin of 50 to 80% by weight, particularly preferably 55 to 70% by weight, results.

The poly-protic acid or salts thereof employed in the third stage of the process according to the invention are preferably phosphoric acid, alkali metal dihydrogen phosphates, mixtures of phosphoric acid and alkali metal orthophosphates, mixtures of alkali metal dihydrogen phosphates and di-alkali metal hydrogen phosphates and mixtures of alkali metal dihydrogen phosphates and alkali metal orthophosphates, phosphoric acid, sodium dihydrogen phosphate and a mixture of phosphoric acid and sodium orthophosphate being particularly preferred.

If desired, the poly-protic acid and/or salts thereof can be employed in the form of aqueous solutions in the third stage of the process according to the invention.

The third stage of the process according to the invention is preferably carried out at a temperature between 50° C. and the boiling point of the reaction mass, particularly preferably between 60° C. and the boiling point of the reaction mass, under the pressure of the surrounding atmosphere.

When the third stage has ended, the resulting reaction mass containing water-insoluble organic solvent is freed from the water-insoluble organic solvent, if appropriate, in a fourth stage.

A preferred embodiment of the process according to the invention for the preparation of an organopolysiloxane resin comprises in a first stage reacting at least one silane of the formula $$R_aSi(OR^1)_{4-a} \quad (I)$$

in which
a is 0, 1, 2 or 3,
R can be identical or different and represents a monovalent organic radical,
$R^1$ can be identical or different and represents a monovalent organic radical, and/or a partial hydrolyzate thereof, with the proviso that at least one silane of formula (I) where a is 0 or 1 and,
optionally, an organo(poly)siloxane chosen from the group consisting of $$R^2{}_3Si\text{-}O\text{-}SiR^2{}_3 \quad (II)$$

in which
$R^2$ can be identical or different and has one of the meanings given for R, $$(R^3{}_2SiO)_b \quad (III)$$

in which
$R^3$ can be identical or different and has one of the meanings given for R and
b is an integer having a value of from 3 to 8, preferably 4 or 5, and mixtures thereof,
with water in the presence of a poly-protic acid and optionally further substances,
subsequently partially neutralizing the acid by addition of a base and then distilling off at least some of the resulting compound $R^1OH$,
in a second stage, reacting the homogeneous reaction mass resulting from the first stage in the presence of a base and a water-insoluble organic solvent and distilling off the water and the compound $R^1OH$,
in a third stage, bringing the homogeneous reaction mass resulting from the second stage to a pH of between 6 and 8 by buffering with a poly-protic acid and/or salts thereof, distilling off the water and any compound $R^1OH$ still present and filtering off the salt which has precipitated, and
optionally, in a fourth stage, freeing the homogeneous reaction mass resulting from the third stage from the water-insoluble organic solvent.

In a particularly preferred embodiment of the process according to the invention, a silane of formula (I) where a is 0, in particular tetraethoxysilane, and/or a partial hydrolyzate thereof, and an organo(poly)siloxane of formula (II) are mixed with water and a poly-protic acid, in particular sulfuric acid, and reacted first at 60° C. and then at the boiling point of the reaction mass. In the case of tetraethoxysilane and/or a partial hydrolyzate thereof 78° C., under a pressure of between 900 and 1100 hPa. The resulting reaction mass is partly neutralized with a base and the compound $R^1OH$ is partially removed by distillation. In a second stage, the reaction mass resulting from the first stage is reacted in the presence of a base and a water-insoluble organic solvent, in particular cyclohexane or methylcyclohexane, water and the compound $R^1OH$ are simultaneously distilled off azeotropically at atmospheric pressure until the boiling point of the organic solvent is reached.

In a third stage, the basic reaction mass resulting from the second stage is brought to a pH of between 6 and 8 with phosphate buffer at 60° C. under a pressure of the surrounding atmosphere, water and any compound $R^1OH$ still present are distilled off azeotropically and the salt which has precipitated is filtered off, $R^1$ having the above mentioned meaning.

Optionally, in a fourth stage, the water-insoluble organic solvent is removed.

The individual components in the process according to the invention can in each case be a single component or a mixture of components.

Examples of the organopolysiloxane resins prepared according to the invention are $[Me_3SiO_{1/2}]_x[SiO_{4/2}]_y$, where Me is the methyl radical and the ratio of x:y is 0.6:1 to 0.9:1 and $[Me_3SiO_{1/2}]_x[Me_2ViSiO_{1/2}]_y[SiO_{4/2}]_z$, where Me is the methyl radical, Vi is the vinyl radical, the ratio of (x+y):z is 0.6:1 to 0.9:1 and the ratio of x:y is 98:2 to 80:20.

The organopolysiloxane resin according to the invention has an average molecular weight of preferably 2000 to 20,000 g/mol and contains on an average not more than up to 5 mol percent of radical $-OR^1$, where $R^1$ has the above mentioned meaning, based on the total number of silicon atoms per resin molecule. If the organopolysiloxane resin is prepared from a silane of formula (I) where a is 0 and an organo(poly)siloxane of formula (II), the stoichiometric ratio of tetrafunctional to monofunctional siloxane units in the resin corresponds to the corresponding molar contents, based on the silicon, in the starting compounds.

The organopolysiloxane resin prepared according to the invention has the advantage that it is at least partly soluble, but preferably completely soluble, in liquid organopolysiloxane.

The process according to the invention has the advantage that it is very easy to carry out, has a very good reproducibility and gives high space/time yields. The water-insoluble organic solvent used can be recovered in a simple manner. Another advantage is that no liquid/liquid phase separation is carried out in the process according to the invention, and no losses in yield thereby occur.

Organopolysiloxane resins of high purity which have a high storage stability and can be further processed to products of high storage stability are obtained by the process according to the invention.

The organopolysiloxane resins according to the invention are suitable for all uses for which it has also been possible to employ organopolysiloxane resins to date. The organopolysiloxane resin according to the invention can be used as foam stabilizers and as additives to antifoam agents, toners and paint and other coating systems, such as, compositions for coating paper.

In the examples which follow, all the parts and percentage data relate to the weight, unless stated otherwise. Unless stated otherwise, the following examples are carried out under a pressure of the surrounding atmosphere, under about 1000 hPa, and at room temperature, at about 20° C., or at a temperature which is established when the reactants are mixed together at room temperature without additional heating or cooling.

EXAMPLE 1

A mixture of 340 g (2.1 mol) of hexamethyldisiloxane, 56 g (0.3 mol) of 1,3-divinyltetramethyldisiloxane, 900 g (corresponding to 6.0 mol of $SiO_2$ units) of tetraethoxysilane with an $SiO_2$ content of 40% (commercially obtainable under the name TES 40 from Wacker-Chemie GmbH, Munich), 250 g of water and 16 g of 10% strength H$_2$SO$_4$ in water is heated under reflux at a temperature of 60° C. for of 1 hour and then at 78° C. for of 2 hours. 10 g of 10% strength NaOH in water are added to the homogeneous mixture thus obtained, and 650 g of distillate which, according to analysis by gas chromatography, contains 0.8% of hexamethyldisiloxane, in addition to ethanol and water, are then removed in the course of 1 hour. Thereafter, 800 ml of cyclohexane and 12 g of 10% strength NaOH in water are added to the homogeneous mixture, and 160 g of water/ethanol mixture are then distilled off azeotropically over a period of 90 minutes. The homogeneous mixture thus obtained is now acidified with 5 g of phosphoric acid (85% strength in water), the mixture is stirred at 60° C. for a period of 1 hour, 80 g of 10% strength Na$_3$PO$_4$.12-H$_2$O solution in water are then added and the mixture is stirred at 60° C. for a further 15 minutes. Thereafter, 80 g of water/ethanol mixture are distilled off azeotropically over a period of 1 hour, and a further 200 ml of cyclohexane are removed by distillation. After the sodium salts which have precipitated have been filtered off, 1220 g of a 61% strength neutral resin solution in cyclohexane are obtained. $^1$H- and $^{29}$Si-NMR spectroscopic analysis of organopolysiloxane resin shows the composition [Me$_3$SiO$_{\frac{1}{2}}$]$_{0.7}$[Me$_2$ViSiO$_{\frac{1}{2}}$]$_{0.1}$[SiO$_{4/2}$] where Me is the methyl radical and Vi is the vinyl radical.

The molar ratio of monofunctional to tetrafunctional siloxane units of 0.8 and the molar ratio of trimethylsilyl to vinyldimethylsilyl end groups thus corresponds to the molar contents of the educts employed. According to $^{29}$Si-NMR spectroscopic analysis, the resin concentrate prepared according to the invention contains no hexamethyldisiloxane.

The residual ethoxy content in the organopolysiloxane resin is 3.8 mol percent, based on the silicon atoms. The yield of organopolysiloxane resin is 95% of theory.

Comparison Example 1

The mixture described in Example 1 is heated under reflux at a temperature of 60° C. for a period of 1 hour an then at 78° C. for a period of 2 hours. 650 g of distillate which, according to analysis by gas chromatography, contains 2.3% of hexamethyldisiloxane, in addition to ethanol and water, are removed in the course of 1 hour from the homogeneous mixture thus obtained, without prior addition of a base. The subsequent procedure is as described in Example 1. After the sodium salts which have precipitated have been filtered off, 1200 g of a 60% strength neutral resin solution in cyclohexane are obtained. $^1$H- and $^{29}$Si-NMR spectroscopic analysis of the organopolysiloxane resin shows a molar ratio or monofunctional to tetrafunctional siloxane units of 0.7, which is thus lower than the molar ratio of mono- to tetrafunctional units of 0.8 predetermined by the educts employed. According to $^{29}$Si-NMR spectroscopy analysis, the resin concentrate thus prepared contains free hexamethyldisiloxane.

The residual ethoxy content in the organopolysiloxane resin is 3.6 mol percent, based on the silicon atoms.

Comparison Example 2

100 g of water and 2 g of 10% strength HCl in water are added to 450 g of tetraethoxysilane with an SiO$_2$ content of 40% (commercially obtainable under the name TES 40 from Wacker-Chemie GmbH, Munich; corresponds to 3.0 mol of SiO$_2$ units), 170 g (1.05 mol) of hexamethyldisiloxane and 28 g (0.15 mol) of 1,3-divinyltetramethyldisiloxane, the mixture is heated under reflux at a temperature of 78° C. for a period of 2 hours and 235 g of distillate are then removed over a period of 30 minutes. Thereafter, 150 ml of tetrahydrofuran and 4.0 g of a 40% strength solution of methylamine in water (commercially obtainable from Merck, Darmstadt) are added to the homogeneous mixture and the entire mixture is heated under reflux at 65° C. for a period of 3 hours. The homogeneous reaction mass thus obtained is then introduced into 3 liter of water, while stirring vigorously, and the precipitate formed is filtered off and dried at 110° C. $^1$H- and $^{29}$Si-NMR spectroscopic analysis of the organopolysiloxane resin shows a molar ratio of monofunctional to tetrafunctional siloxane units of 0.7, which is therefore lower than the molar ratio of mono- to tetrafunctional units of 0.8 predetermined by the educts employed.

The residual ethoxy content in the organopolysiloxane resin is 2.4 mol percent, based on the silicon atoms.

EXAMPLE 2

A mixture of 340 g (2.1 mol) of hexamethyldisiloxane, 900 g (corresponds to 6.0 mol of SiO$_2$ units) of tetraethoxysilane with an SiO$_2$ content of 40% (commercially obtainable under the name TES 40 from Wacker-Chemie GmbH, Munich), 250 g of water and 16 g of 10% strength H$_2$SO$_4$ in water is heated under reflux at a temperature of 60° C. for a period of 1 hour and then at 78° C. for a period of 2 hours. 10 g of 10% strength NaOH in water are then added to the homogeneous mixture thus obtained, and 650 g of distillate, which, according to analysis by gas chromatography, contains 0.8% of hexamethyldisiloxane, in addition to ethanol and water, are then removed in the course of one hour. Thereafter, 800 ml of cyclohexane and 12 g of 10% strength NaOH in water are added to the homogeneous mixture and 160 g of water/ethanol mixture are then distilled off azeotropically over a period of 90 minutes. The homogeneous mixture thus obtained is now acidified with 5 g of phosphoric acid (85% strength in water), the mixture is stirred at 60° C. for a period of 1 hour, 8 g of solid Na$_3$PO$_4$.12H$_2$O are then added and the mixture is stirred at 60° C. for a further 30 minutes. Thereafter, 6 g of water/ethanol mixture are distilled off azeotropically over a period of 15 minutes and a further 200 ml of cyclohexane are removed by distillation. After the sodium salts which have precipitated have been filtered off, 1140 g of a 61% strength neutral resin solution in cyclohexane are obtained. $^1$H- and $^{29}$Si-NMR spectroscopic analysis of the organopolysiloxane resin shows the composition [Me$_3$SiO$_{\frac{1}{2}}$]$_{0.7}$[SiO$_{4/2}$] where Me is the methyl radical.

The molar ratio of monofunctional to tetrafunctional siloxane units thus corresponds to the molar contents of the educts employed. According to $^{29}$Si-NMR spectroscopy analysis, the resin concentrate prepared according to the invention contains no hexamethyldisiloxane.

The residual ethoxy content in the organopolysiloxane resin is 3.9 mol percent, based on the silicon atoms. The yield of organopolysiloxane resin is 96% of theory.

What is claimed is:

1. A process for the preparation of an organopolysiloxane resin, which comprises reacting;

(A) in a first stage at least one silane of the formula

in which a is 0, 1, 2 or 3,

R is a monovalent organic radical, $R^1$ is a monovalent organic radical, and/or a partial hydrolyzate thereof, with the proviso that at least one silane of formula (I) where (a) is 0 or 1 and/or a partial hydrolyzate thereof is present, and, optionally, an organo(poly)-siloxane of the formula $$R^2{}_3Si\text{-}O\text{-}SiR^2{}_3 \qquad (II)$$

in which $R^2$ is a monovalent organic radical, and/or $$(R^3{}_2SiO)_b \qquad (III)$$

in which $R^3$ is a monovalent organic radical b is an integer having a value from 3 to 8, with water in the presence of a poly-protic acid, thus forming a homogeneous reaction mass subsequently partially neutralizing the acid by addition of a base in an amount such that less than 100% by weight of the acid is neutralized and then distilling off a resulting compound $R^1OH$.

2. The process as claimed in claim 1, wherein sulfuric acid is the poly-protic acid in the first stage.

3. The process as claimed in claim 1, wherein a mixture of an organo(poly)siloxane of formula (II) and a silane of formula (I), where a is 0, and/or a partial hydrolyzate thereof is present in the first stage.

4. The process as claimed in claim 1, wherein (A) in the first stage at least one silane of the formula $$R_aSi(OR^1)_{4-a} \qquad (I)$$

in which a is 0, 1, 2 or 3,

R is a monovalent organic radical, $R^1$ is a monovalent organic radical, and/or a partial hydrolyzate thereof, with the proviso that at least one silane of formula (I) where (a) is 0 or 1 and/or a partial hydrolyzate thereof is present, and, optionally, an organo(poly) siloxane of the formula $$R^2{}_3Si\text{-}O\text{-}SiR^2{}_3 \qquad (II)$$

in which $R^2$ is a monovalent organic radical, and/or $$(R^3{}_2SiO)_b \qquad (III)$$

in which $R^3$ is a monovalent organic radical b is an integer having a value from 3 to 8, with water in the presence of a poly-protic acid, thus forming a homogeneous reaction mass subsequently partially neutralizing the acid by addition of a base in an amount such that less than 100% by weight of the acid is neutralized and then distilling off a resulting compound $R^1OH$;

(B) in a second stage, reacting the homogeneous reaction mass from the first stage with a base in the presence of a water-insoluble organic solvent and distilling off the water and any resulting $R^1OH$;

(C) in a third stage, adding to the homogeneous reaction mass from the second stage a poly-protic acid and/or salts thereof, in an amount sufficient to obtain a pH of from 6 to 8, distilling off water and any resulting $R^1OH$, and filtering off any precipitate; and (D) in a fourth stage separating the organopolysiloxane resin from the third stage, from the water-insoluble organic solvent.

5. The process as claimed in claim 1, wherein the water-insoluble organic solvent is selected from the group consisting of cyclohexane and methylcyclohexane.

6. The process as claimed in claim 4, wherein the poly-protic acid and/or salts thereof employed in the third stage are chosen from the group consisting of phosphoric acid, sodium dihydrogen phosphate and a mixture of phosphoric acid and sodium orthophosphate.

7. The process as claimed in claim 4, wherein a silane of formula (I) where a is 0 and/or a partial hydrolyzate thereof and an organo(poly)siloxane of the formula (II) in a first stage are mixed with water and a poly-protic acid, the mixture is reacted first at 60° C. and then at the boiling point of the mixture under a pressure of between 900 and 1100 hPa, the resulting homogeneous reaction mass is partly neutralized with a base in an amount such that less than 100% by weight of the acid is neutralized and the resulting compound $R^1OH$ is removed by distillation;

in a second stage the reaction mass resulting from the first stage is reacted in the presence of a base and a water-insoluble organic solvent, the water and by-product are simultaneously distilled off azeotropically under the pressure of the surrounding atmosphere until the boiling point of the organic solvent is reached, in a third stage the basic reaction mass resulting from the second stage is brought to a pH of between 6 and 8 with phosphate buffer at 60° C. under a pressure of the surrounding atmosphere, water and compound $R^1OH$ still present are distilled off azeotropically and any salt which has precipitated is filtered off, and optionally, in a fourth stage the water-insoluble organic solvent is removed.

8. A process as claimed in claim 1, wherein the homogeneous reaction mass of the first stage is in a second stage further reacted with a base in the presence of a water-insoluble organic solvent and distilling off water and the resulting compound $R^1OH$.

9. A process as claimed in claim 8, wherein a poly-protic acid is added to the homogeneous reaction mass of the second stage, in an amount sufficient to obtain a pH of from 6 to 8, distilling off water and any remaining $R^1OH$, and filtering off any precipitate.

10. A process as claimed in claim 9 wherein the organopolysiloxane resin is separated from the water-insoluble organic solvent.

* * * * *

UNITED STATES PATENT AND TRADEMARK OFFICE
CERTIFICATE OF CORRECTION

PATENT NO. : 5,401,821
DATED : March 28, 1995
INVENTOR(S) : Michael Geck, Christian Herzig, Bernward Deubzer and Helmut Oswaldbauer It is certified that error appears in the above-indentified patent and that said Letters Patent is hereby corrected as shown below:

Column 12, line 11, after "(D)", insert --- optionally, ---.

Signed and Sealed this

Nineteenth Day of September, 1995

Attest:

BRUCE LEHMAN

*Attesting Officer*  *Commissioner of Patents and Trademarks*